Patented Jan. 25, 1944

2,340,123

UNITED STATES PATENT OFFICE 2,340,123

PROCESS OF MAKING COLD MOLDING COMPOSITIONS

William R. Heineman, Meriden, Conn., assignor to General Electric Company, a corporation of New York No Drawing. Application January 29, 1941, Serial No. 376,495

1 Claim. (Cl. 260—7)

The present invention relates to molding compounds and products and to a process for making the same.

The invention is particularly concerned with the preparation of molding compounds and processes suitable for the manufacture of molding products whose essential physical properties include a high resiliency, good wear resistance and high impact strength. Molded products for which my molding composition is particularly suited are the wheels, including the tread portions thereof, for indoor roller skates. It is obvious that such products must possess all of the above-mentioned physical properties to a marked degree in order to withstand the severe use to which they are normally subjected.

In accordance with the invention, the cold molding compounds are prepared by incorporating a suitable filler containing some fibrous material into a specific binder comprising a viscous liquid mixture of animal glue and a neutralized, solventless, phenol-aldehyde resin varnish, thoroughly mixing the combined filler and binder, and disintegrating and drying the mixture to obtain a molded product hardenable after molding by the application of suitable heat treatment.

The preferred filler formulation consisting at least in part of fibrous filling materials includes asbestos, silex and wood flour with or without the addition of coloring matter such as red oxide and carbon black. If desired, other fillers such as cotton flock, paper flock, dried paper pulp or the like can also be used in the filler formulation. These materials may be substituted advantageously for part of the asbestos. It is usually desirable that some of the filler comprise wood flour as the use of this material gives a lighter weight product.

The animal glue used in the practice of my invention is the ordinary commercial liquid variety containing water as a solvent or liquefying medium. As the phenolaldehyde resin component of the binder I prefer to use a neutral solventless liquid phenolic resin. A particularly satisfactory resin is that obtained by reacting phenol and formaldehyde in a mole ratio of 1 to 1.3 in the presence of barium hydroxide as a catalyst at reflux temperature for 45 minutes. The resinous product is cooled to 60° C. after which sufficient carbon dioxide gas is bubbled through the liquid resin to precipitate the catalyst as barium carbonate. The precipitate is filtered off and the filtered resin then dehydrated to the desired viscosity. This type of phenolaldehyde resin exhibits excellent binding characteristics when used in combination with glue in the preparation of cold molded products.

As an example of my invention, I have prepared a cold molding compound having the following composition:

| | | |
|---|---|---|
| Asbestos | pounds | 10 |
| Silex | do | 2 |
| Wood flour | do | 1 |
| Red oxide | do | ½ |
| Carbon black | ounces | 2 |
| Animal glue | pounds | 2 |
| Phenolic varnish | do | 3 |

The filler ingredients and coloring matter are thoroughly mixed in a change can or double arm mixer for 20 minutes or until a uniform mixture results. The binder, comprising a mixture of the animal glue and phenolic varnish, is then added to the thoroughly mixed filler.

The binder mixture is an important feature of my invention. In the preparation thereof the glue which is in a liquid form is stirred with the neutralized, solventless phenolic varnish only to such an extent that the glue becomes only partially mixed or blended with the varnish. During the mixing of these two ingredients in the cold, a marked increase in the viscosity is noted and continued stirring should be avoided as it results in a rubbery mass which cannot be poured onto the filler. However, with only slight agitation the resulting high viscosity mass may be poured onto the filler and will satisfactorily coat the same to produce a granular powder with very good molding characteristics. The mixture should be prepared just prior to pouring. If too long a time lapses between the time the resin and glue are mixed and the time the filler is incorporated, the mixture will rubberize to such an extent that satisfactory coating of the filler cannot be obtained. It is essential, however, that the glue and the varnish be mixed to a certain extent prior to their addition to the filler as otherwise a perfect blend of the materials cannot be obtained in the final product.

After the filler and binder have been mixed cold until a uniform distribution of the binder on the filler results, the mass is ground in a disintegrator or cage mill to break up any lumps resulting from the mixing process and the disintegrated material is allowed to air dry to the proper molding consistency. This molding powder may be molded cold or in molds held at a temperature not exceeding approximately 200° F. The molded parts are hardened by being heat treated for approximately 20 hours at gradually increased temperatures between 140° F. to 260° F.

The proportions of glue and phenolic varnish may be varied as desired as long as the amount of phenolic varnish in the binder exceeds the amount of liquid glue. It is to be understood that my improved molding material may be used in the manufacture of parts other than the roller skate wheels referred to above. For example, I have found that by the omission of wood flour from the formulation molded products possessing excellent electrical and mechanical properties, suitable as electrical insulating materials, can be obtained.

What I claim as new and desire to secure by Letters Patent of the United States is:

The process of producing a cold-molding compound which comprises adding at substantially room temperature about 2 parts by weight of a glue solution to about three parts by weight of a solventless liquid phenol-aldehyde resin obtained by heat reacting at reflux temperatures a phenol and formaldehyde in the mol ratio of 1 to 1.3 and in the presence of an alkaline catalyst comprising an alkaline earth hydroxide, neutralizing and precipitating said catalyst by means of gaseous carbon dioxide and thereafter removing the precipitated catalyst, agitating said glue with said resin only until a partially blended, viscous mass is obtained, and intimately incorporating a fibrous filler into said mass before said mass has set to a rubbery mass.

WILLIAM R. HEINEMAN.